(12) United States Patent
Anegawa et al.

(10) Patent No.: US 11,623,392 B2
(45) Date of Patent: Apr. 11, 2023

(54) METHOD OF MANUFACTURING THREE-DIMENSIONAL FORMED OBJECT AND THREE-DIMENSIONAL FORMING APPARATUS

(71) Applicant: Seiko Epson Corporation, Tokyo (JP)

(72) Inventors: Kenta Anegawa, Matsumoto (JP); Kei Yokota, Matsumoto (JP); Daizo Aoyagi, Shiojiri (JP)

(73) Assignee: SEIKO EPSON CORPORATION

( * ) Notice: Subject to any disclaimer, the term of this patent is extended or adjusted under 35 U.S.C. 154(b) by 443 days.

(21) Appl. No.: 16/274,580

(22) Filed: Feb. 13, 2019

(65) Prior Publication Data
US 2019/0248069 A1 Aug. 15, 2019

(30) Foreign Application Priority Data
Feb. 14, 2018 (JP) .............................. JP2018-024033

(51) Int. Cl.
*B29C 64/194* (2017.01)
*B29C 64/40* (2017.01)
*B29C 64/209* (2017.01)
*B29C 64/118* (2017.01)

(52) U.S. Cl.
CPC .......... *B29C 64/194* (2017.08); *B29C 64/118* (2017.08); *B29C 64/209* (2017.08); *B29C 64/40* (2017.08); *B29C 2793/0009* (2013.01)

(58) Field of Classification Search
CPC ..... B29C 64/194; B29C 64/40; B29C 64/209; B29C 64/118; B29C 2793/0009; B29C 64/188; B29C 64/106; B29C 64/112; B29C 64/20; B33Y 10/00; B33Y 30/00
See application file for complete search history.

(56) References Cited

U.S. PATENT DOCUMENTS

| | | | | |
|---|---|---|---|---|
| 3,954,366 A | * | 5/1976 | Fields | B29C 48/655 425/208 |
| 3,975,485 A | * | 8/1976 | Bollen | B29C 51/002 264/176.1 |
| 5,215,374 A | * | 6/1993 | Meyer | B29C 48/53 366/90 |
| 5,286,573 A | * | 2/1994 | Prinz | B33Y 10/00 264/308 |
| 5,590,454 A | * | 1/1997 | Richardson | B29C 64/188 29/527.4 |

(Continued)

FOREIGN PATENT DOCUMENTS

| | | |
|---|---|---|
| JP | 2005-342998 A | 12/2005 |
| JP | 2006-248039 A | 9/2006 |

(Continued)

*Primary Examiner* — Jacob T Minskey
*Assistant Examiner* — Caroline Beha
(74) *Attorney, Agent, or Firm* — Harness, Dickey & Pierce, P.L.C.

(57) ABSTRACT

A method of manufacturing a three-dimensional formed object includes cutting a material block so as to fabricate a bottom portion that includes an upwardly projecting underlying layer portion. The method also includes forming a molten material into a single layer or a plurality of layers on a top of the underlying layer portion so as to fabricate a first layer portion in contact with the underlying layer portion.

6 Claims, 5 Drawing Sheets

(56) References Cited

U.S. PATENT DOCUMENTS

| | | | | |
|---|---|---|---|---|
| 6,136,132 | A * | 10/2000 | Kinzie | B32B 38/10 |
| | | | | 156/258 |
| 10,688,581 | B2 * | 6/2020 | McQueen | B33Y 30/00 |
| 2002/0147521 | A1 * | 10/2002 | Mok | G05B 19/4099 |
| | | | | 700/118 |
| 2004/0089980 | A1 * | 5/2004 | Owada | B29C 64/106 |
| | | | | 264/308 |
| 2016/0039194 | A1 | 2/2016 | Cable | |
| 2017/0210069 | A1 | 7/2017 | Stubenruss | |

FOREIGN PATENT DOCUMENTS

| | | | |
|---|---|---|---|
| JP | 2007-098822 A | | 4/2007 |
| JP | 2007098822 A | * | 4/2007 |
| JP | 2017-100283 A | | 6/2017 |
| JP | 2017-523934 A | | 8/2017 |

\* cited by examiner

METHOD OF MANUFACTURING THREE-DIMENSIONAL FORMED OBJECT AND THREE-DIMENSIONAL FORMING APPARATUS

This application claims priority under 35 U.S.C. § 119 to Japanese Patent Application No. 2018-024033 filed on Feb. 14, 2018, the entire disclosure of which is expressly incorporated by reference herein.

BACKGROUND

1. Technical Field

The present invention relates to a method of manufacturing a three-dimensional formed object and a three-dimensional forming apparatus.

2. Related Art

JP-A-2017-100283 discloses a three-dimensional forming apparatus using a fused deposition modeling (FDM) method. This three-dimensional forming apparatus includes a forming head, a forming table, and a processing head. The forming head discharges thermoplastic resin. The forming table holds the thermoplastic resin discharged from the forming head. The processing head processes the surface of a three-dimensional formed object formed of the solidified thermoplastic resin.

With a method of manufacturing the three-dimensional formed object disclosed in JP-A-2017-100283, when the molten thermoplastic resin discharged from the forming head is cooled and solidified, bending may occur due to contraction. When the bending occurs, the three-dimensional formed object with desired dimensional accuracy is not necessarily obtained. When the temperature of the forming table is adjusted so as to suppress the bending, the size of the three-dimensional forming apparatus increases.

SUMMARY

An advantage of some aspects of the invention can be realized by the following forms.

1. According to a first aspect of the invention, a method of manufacturing a three-dimensional formed object is provided. This method of manufacturing the three-dimensional formed object includes cutting a material block so as to fabricate a bottom portion that includes an upwardly projecting underlying layer portion. The method also includes forming a molten material into a single layer or a plurality of layers on a top of the underlying layer portion so as to fabricate a first layer portion in contact with the underlying layer portion.

With the method of manufacturing the three-dimensional formed object according to this form, the bottom portion is unlikely to deprive the molten material having been formed into the layer or the layers on the top of the underlying layer portion of heat. This increases the welding strength between the molten material having been formed into the layer or the layers and the bottom portion. Thus, even in the case where the molten material having been formed into the layer or the layers contracts when the molten material is cooled and solidified, the molten material is unlikely to be removed from the bottom portion. Accordingly bending of the three-dimensional formed object can be suppressed.

2. In the method of manufacturing the three-dimensional formed object, after the forming of the molten material into the single layer or the plurality of layers on the top of the underlying layer portion, the solidified molten material may be cut so as to fabricate the first layer portion.

With the method of manufacturing the three-dimensional formed object according to this form, the solidified molten material is cut so as to be shaped after the molten material have been formed into the layer or the layers. Thus, the three-dimensional formed object can be fabricated with dimensional accuracy.

3. The method of manufacturing the three-dimensional formed object may further include forming the molten material into a single layer or a plurality of layers on a top of the first layer portion after the forming of the molten material into the single layer or the plurality of layers on the top of the underlying layer portion. In addition, the method may further include repeatedly cutting the solidified molten material so as to fabricate a second layer portion in contact with the first layer portion.

With the method of manufacturing the three-dimensional formed object according to this form, the three-dimensional formed object having a large size can be fabricated by repeatedly performing the formation of the layers of the molten material and cutting of the solidified molten material.

4. The method of manufacturing the three-dimensional formed object may further include securing the material block to a forming table by suction before the cutting of the material block.

With the method of manufacturing the three-dimensional formed object according to this form, the bottom portion is secured to the forming table. Thus, deformation of the bottom portion is suppressed, and accordingly, bending of the three-dimensional formed object can be suppressed.

5. The method of manufacturing the three-dimensional formed object may further include forming the molten material into a layer or layers so as to fabricate the material block.

With the method of manufacturing the three-dimensional formed object according to this form, the bottom portion, the first layer portion, and the second layer portion can be fabricated from the same material. Accordingly, variation in composition of the material can be suppressed. Thus, the composition of the material can be made uniform, and accordingly, the bending of the three-dimensional formed object can be further suppressed.

6. In the method of manufacturing the three-dimensional formed object, the forming of the molten material into the single layer or the plurality of layers on the top of the underlying layer portion may include converting a material into the molten material by using a flat screw.

With the method of manufacturing the three-dimensional formed object according to this form, the material can be converted into the molten material by using the flat screw having a small size. Thus, the three-dimensional formed object can be manufactured by using the three-dimensional forming apparatus having a small size.

7. According to a second aspect of the invention, a three-dimensional forming apparatus is provided. This three-dimensional forming apparatus includes a forming head that forms a molten material into a layer or layers, a cutting head with which the solidified molten material is cut, and a controller that controls the forming head and the cutting head so as to fabricate a three-dimensional formed object. The controller performs, so as to fabricate the three-dimensional formed object, first control that causes a material block to be cut so as to fabricate a bottom portion which includes an upwardly projecting underlying layer portion and a second control that causes the molten material to be formed into a single layer or a plurality of layers on a top of the underlying layer portion so as to fabricate a first layer portion in contact with the underlying layer portion.

With the three-dimensional forming apparatus according to this form, bending of the three-dimensional formed object can be suppressed without adjusting the temperature of a forming table by using a heater or the like. Thus, the size of the three-dimensional forming apparatus can be reduced.

8. In the three-dimensional forming apparatus, the forming head may include a nozzle, a screw facing portion, and a flat screw. The nozzle has an opening through which the molten material is discharged. The screw facing portion has a communicating hole communicating with the opening and includes a heater. The flat screw has a groove portion at a position thereof facing the screw facing portion, converts a material into the molten material by rotation thereof together with heat by the heater, and supplies the molten material to the nozzle through the communicating hole.

With the three-dimensional forming apparatus according to this form, the size of the forming head can be reduced by using the flat screw. Thus, the size of the three-dimensional forming apparatus can be reduced.

The aspects of the invention can also be realized in various forms other than the above-described method of manufacturing the three-dimensional formed object and the three-dimensional forming apparatus. For example, the aspects of the invention can be realized, for example, in the form of a method of three-dimensional forming.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
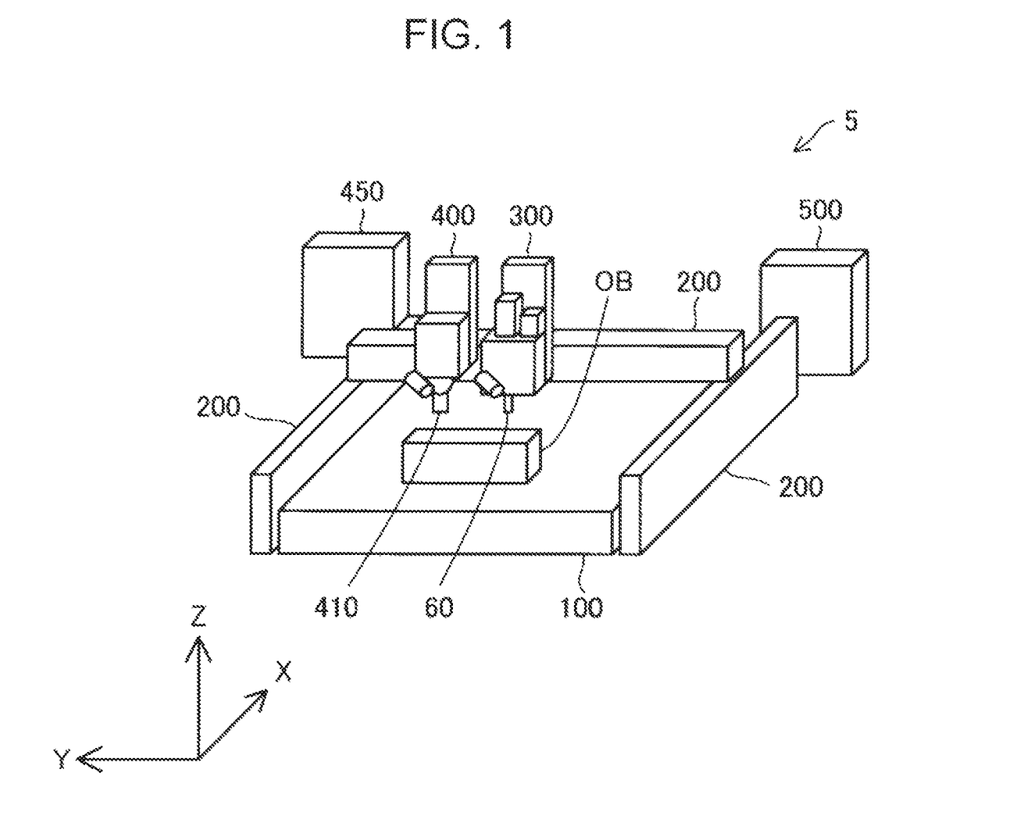
FIG. 1 schematically illustrates the structure of a three-dimensional forming apparatus.

FIG. 1 schematically illustrates the structure of a three-dimensional forming apparatus 5 according to a first embodiment. The three-dimensional forming apparatus 5 according to the present embodiment includes a forming table 100, a movement mechanism 200, a forming head 300, a cutting head 400, and a controller 500. In FIG. 1, three directions X, Y, and Z that are perpendicular to one another are indicated. The X direction and the Y direction are horizontal directions. The Z direction is a vertical direction. These directions are indicated also in the other drawings according to need.

The movement mechanism 200 is provided around the forming table 100 where a three-dimensional formed object OB is fabricated by forming a molten material into layers and cutting the molten material. The forming head 300 and the cutting head 400 are provided in the movement mechanism 200. The movement mechanism 200 is a three-axis positioner that can move the forming head 300 and the cutting head 400 in three axial directions, that is, the X, Y, and Z directions. The movement mechanism 200 has a function of changing the relative positional relationships between the forming head 300, the cutting head 400, and the forming table 100. The three-dimensional formed object OB having an arbitrary shape can be manufactured by changing the relative positional relationships between the forming head 300, the cutting head 400, and the forming table 100 by using the movement mechanism 200. Although the movement mechanism 200 three-dimensionally moves the forming head 300 and the cutting head 400 according to the present embodiment, the movement mechanism 200 may be a mechanism that three-dimensionally moves the forming table 100. Alternatively, a movement mechanism that moves the forming head 300 and the cutting head 400 in a one or two of the axial directions and moves the forming table 100 in the other axial direction or the other axial directions may be employed.

The forming head 300 discharges the molten material from a nozzle 60 so as to form the layers for the three-dimensional formed object OB. The detailed structure of the forming head 300 will be described later (see FIG. 2).

The cutting head 400 rotates a cutting tool 410 attached to a rotating shaft so as to perform cutting for the three-dimensional formed object OB. The distal end position of the cutting tool 410 of the cutting head 400 is measurable. Thus, the controller 500 controls the cutting head 400 and the movement mechanism 200, thereby controlling the relative positional relationship between the cutting tool 410 and the three-dimensional formed object OB. According to the present embodiment, the three-dimensional forming apparatus 5 includes a tool magazine 450 in which a variety of cutting tools 410 are housed. Examples of the cutting tool 410 include, for example, a flat end mill, a ball end mill, and so forth. The three-dimensional forming apparatus 5 has an automatic tool exchange function. The controller 500 causes the cutting tool 410 attached to the cutting head 400 to be exchanged to another tool housed in the tool magazine 450 depending on application. The three-dimensional forming apparatus 5 may include a plurality of cutting heads. In this case, when the cutting heads can be independently driven, regions of the three-dimensional formed object OB where the cutting tool is difficult to reach due to the shape of the three-dimensional formed object OB can be reduced. The cutting head 400 may include a static eliminator such as an ionizer.

The controller 500 performs control on the movement mechanism 200, the forming head 300, and the cutting head 400. The controller 500 can be realized by, for example, a computer that includes a processor such as a central processing unit (CPU), main memory, and nonvolatile memory. The nonvolatile memory of the controller 500 stores a computer program for controlling the three-dimensional forming apparatus 5. When the controller 500 executes the computer program, a method of manufacturing the three-dimensional formed object that includes a first step, a second step, and a third step is realized (see FIG. 5). The first step, the second step, and the third step will be described later.

Figure 2:
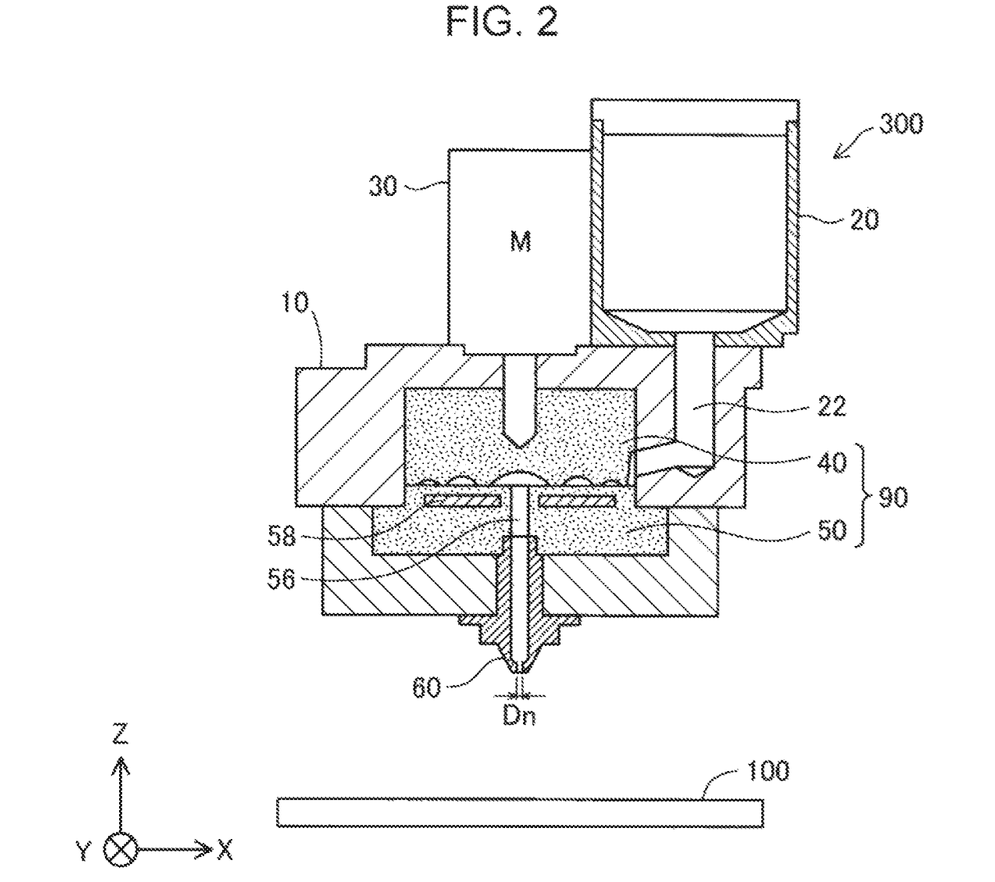
FIG. 2 is a conceptual view of a forming head.

FIG. 2 is a conceptual view of the forming head 300. The forming head 300 includes a drive motor 30, a plasticizing unit 90, and the nozzle 60. The plasticizing unit 90 includes a flat screw 40 and a screw facing portion 50. The flat screw 40 is housed in a screw case 10 and rotated by the drive motor 30. The screw facing portion 50 faces a scroll groove forming surface 48 (see FIG. 3) and has a communicating hole 56 at the center thereof. The screw facing portion 50 includes a heater 58 therein. The plasticizing unit 90 plasticizes a material supplied between the flat screw 40 and the screw facing portion 50 by rotation of the flat screw 40 and heat from the heater 58. Thus, the material is converted into a molten material. The molten material is supplied from the communicating hole 56 to the nozzle 60. The nozzle 60 ejects the molten material supplied from the communicating hole 56. An opening at a distal end of the nozzle 60 has a nozzle hole diameter Dn. The term "plasticize" refers to melting of a material by application of heat.

The material is supplied from a hopper 20 to the plasticizing unit 90 through a communicating path 22. A thermoplastic material is changed in the hopper 20. Examples of the material that can be used include polypropylene resin (PP), polyethylene resin (PE), polyacetal resin (POM), polyvinyl chloride resin (PVC), polyamide resin (PA), acrylonitrile butadiene styrene resin (ABS), polylactic resin (PLA), polyphenylene sulfide resin (PPS), polyether ether ketone (PEEK), polycarbonate resin (PC), and so forth. Regarding the form of the material, a solid material in the form of, for example, a pellet or powder can be used. The thermoplastic material may be a composition including a thermoplastic material and another component.

Figure 3:
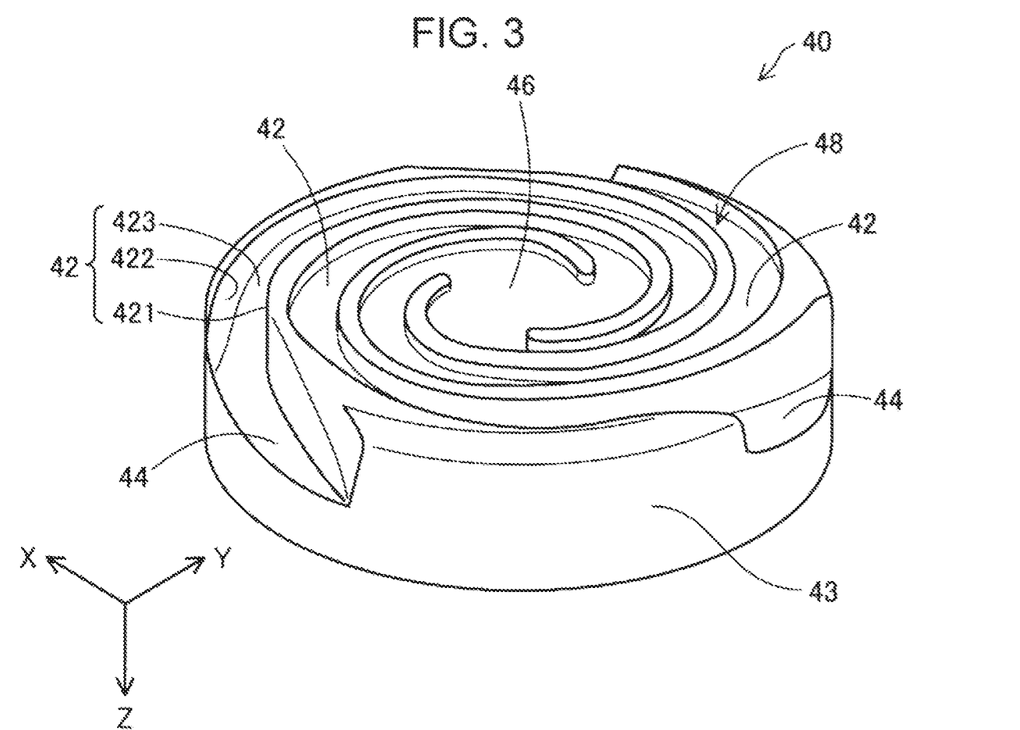
FIG. 3 is a perspective view of a flat screw.

FIG. 3 is a perspective view of the flat screw 40. The flat screw 40 has a substantially cylindrical shape the height of which in the axial direction is smaller than the diameter thereof. The flat screw 40 has a plurality of scroll grooves 42 in a surface thereof facing the screw facing portion 50 (see FIG. 2). The surface in which the scroll grooves 42 are formed is referred to as "scroll groove forming surface 48" (groove portion). The scroll grooves 42 are formed to have a scroll shape or a spiral shape from an outer circumference of the flat screw 40 toward a central portion 46 of the scroll groove forming surface 48. The depth of the scroll grooves 42 increases toward the outer circumference of the flat screw 40. However, the depth of the scroll grooves 42 may be uniform in some portions (for example, portions near the central portion 46). A plurality of material inlet openings 44 are formed in a side surface 43 of the flat screw 40. The material is received between the flat screw 40 and the screw facing portion 50 through the material inlet openings 44. The material inlet openings 44 are continuous with the scroll grooves 42. The material is supplied from the hopper 20 to the material inlet openings 44 through the communicating path 22.

Each of the scroll grooves 42 is defined by an inner wall 421 positioned radially inside, an outer wall 422 positioned radially outside, and a bottom wall 423. The shapes of the inner wall 421 and the outer wall 422 are set, for example, based on involute curves with reference to circles concentric with the rotation center of the flat screw 40. The material supplied into the scroll grooves 42 is guided from the proximity of the outer wall 422 toward the inner wall 421 by the rotation of the flat screw 40. Furthermore, when the flat screw 40 is rotated, the material is kneaded between the scroll grooves 42 and the screw facing portion 50 and heated by the heater 58 so as to be plasticized. Thus, the material is converted into the molten material.

Figure 4:
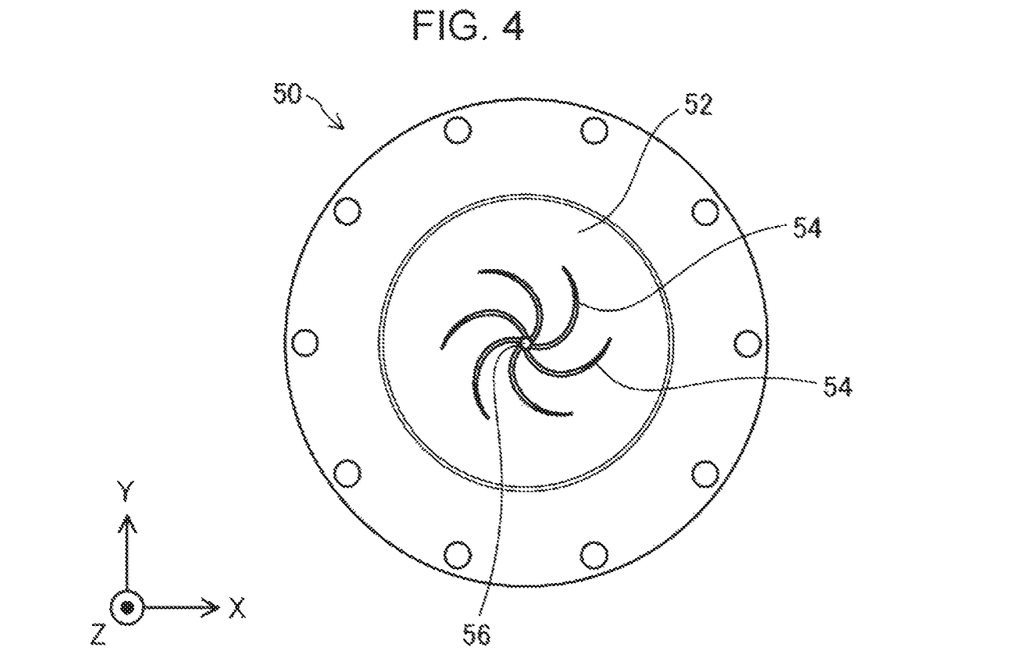
FIG. 4 is a plan view of a screw facing portion.

FIG. 4 is a plan view of the screw facing portion 50. The screw facing portion 50 has a screw facing surface 52 that faces the scroll groove forming surface 48 of the flat screw 40. A plurality of guide grooves 54 having a scroll shape or a spiral shape are formed in the screw facing surface 52. The communicating hole 56 for supplying the molten material to the nozzle 60 is formed at the center of the screw facing surface 52. The plurality of guide grooves 54 has a function of guiding the molten material to the communicating hole 56. As illustrated in FIG. 2, the heater 58 for heating the material is embedded in the screw facing portion 50.

The molten material is heated up to the glass-transition temperature or higher and ejected in a completely molten state from the nozzle 60. For example, the glass-transition temperature of ABS resin is about 110 degrees centigrade, and the temperature of the ABS resin when ejected from the nozzle 60 is about 200 degrees centigrade. For the ejection of the molten material in a high-temperature state, a heater may be provided around the nozzle 60.

Figure 5:
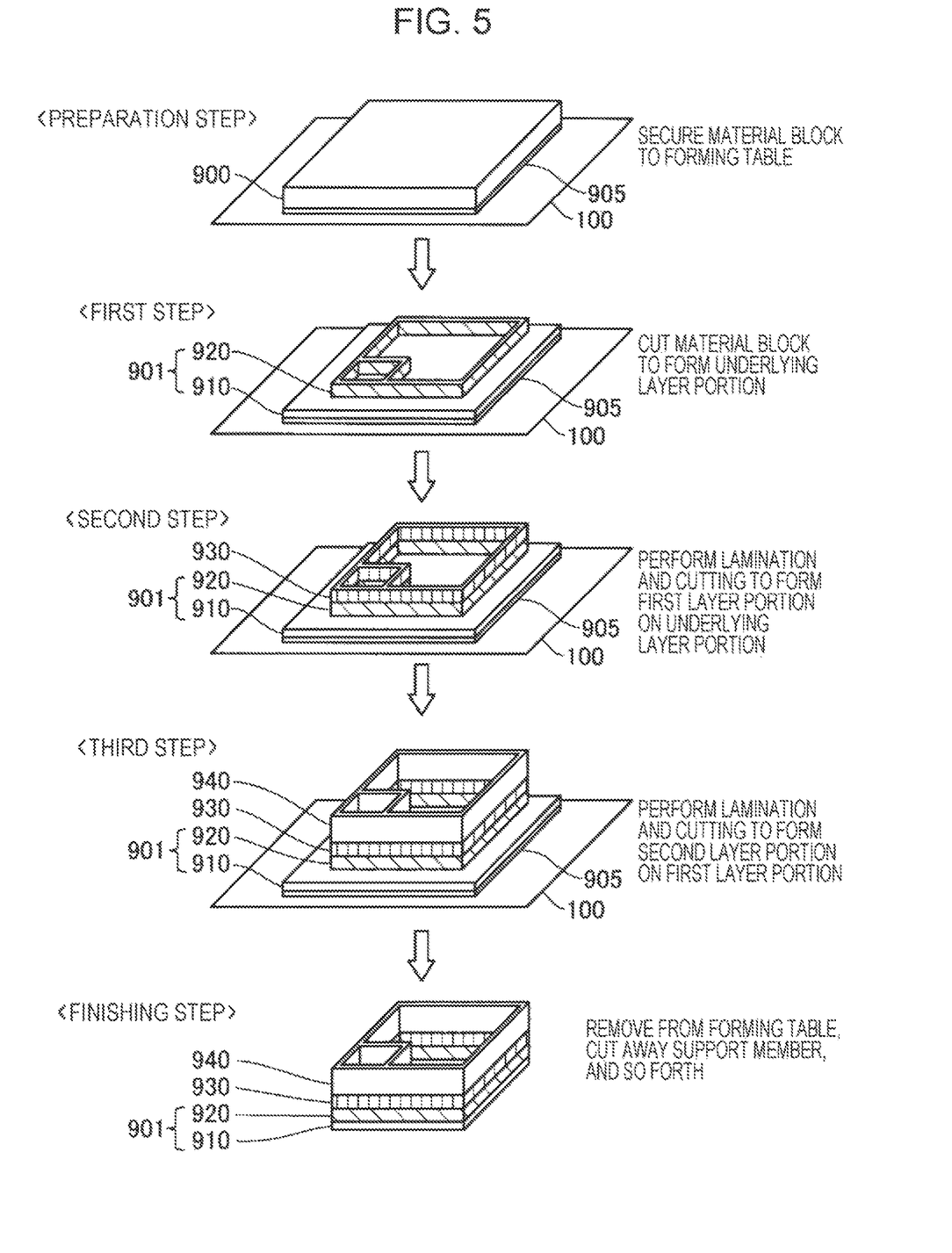
FIG. 5 is a process chart illustrating a method of manufacturing a three-dimensional formed object.

FIG. 5 is a process chart illustrating the method of manufacturing the three-dimensional formed object according to the present embodiment. The method of manufacturing the three-dimensional formed object according to the present embodiment includes a preparation step, a first step, a second step, a third step, and a finishing step. Fabrication of the three-dimensional formed object is performed in this order.

First, in the preparation step preceding a first step, a material block 900 is secured to the forming table 100. According to the present embodiment, an adhesive layer 905 of, for example, adhesive tape or wax is provided on the forming table 100, and the material block 900 is secured onto the adhesive layer 905. The forming table 100 may be provided with a suction hole and a vacuum pump. In this case, the material block 900 is sucked from the forming table 100 side so as to be secured onto the forming table 100. The material block 900 may be fabricated by forming the molten material into a layer or layers by using the forming head 300 before the preparation step is started. The material block 900 may be fabricated by forming the molten material into the layer or the layers by using the forming head 300, and then, cutting the solidified molten material so as to shape the molten material. The material block 900 may be fabricated by another three-dimensional forming apparatus, and then secured to the forming table 100. Alternatively, the material block 900 may be fabricated by forming into the layer or the layers directly on the forming table 100 by using the forming head 300. Herein, the term "shape" refers to processing of the solidified molten material having been formed into the layer or the layers so as to obtain a desired three-dimensional formed object OB. Examples of the processing include, for example, as follows: removing the molten material that has been unintentionally dripped from the nozzle 60, has adhered to the three-dimensional formed object OB under fabrication, and has been solidified; processing the three-dimensional formed object OB under fabrication to desired dimensions; and processing the three-dimensional formed object OB under fabrication so as to have a desired surface roughness.

Next, in the first step, the controller 500 performs first control to cause the cutting head 400 to cut the material block 900 secured to the forming table 100. Thus, a bottom portion 901 is fabricated. The bottom portion 901 has a base portion 910 and an underlying layer portion 920 projecting upward from the base portion 910.

In the second step performed after the first step, the controller 500 performs second control to cause the forming head 300 to form the molten material into a single or a plurality of layers on the top of the underlying layer portion 920 such that the single or the plurality of layers have a shape following the shape of the three-dimensional formed object OB. Thus, a first layer portion 930 in contact with the underlying layer portion 920 is fabricated. In the second step, the controller 500 may perform control to form the molten material into the single or the plurality of layers on the top of the underlying layer portion 920 such that the single or the plurality of layers have the shape following the shape of the three-dimensional formed object OB, and after that, cut the solidified molten material so as to shape the solidified molten material to fabricated the first layer portion 930.

In the third step performed after the second step, the controller 500 performs third control to cause the following steps to be repeatedly performed: forming by using the forming head 300 the molten material into a single or a plurality of layers on the top of the first layer portion 930 such that the single or the plurality of layers have a shape following the shape of the three-dimensional formed object OB; and cutting the solidified molten material so as to shape the solidified molten material. Thus, a second layer portion 940 in contact with the first layer portion 930 is fabricated.

After that, in the finishing step, the controller 500 causes the cutting head 400 to perform surface finishing for a shape including a finished shape of the layered three-dimensional formed object OB and cut away an excess material of the base portion 910. After the finishing step, the three-dimensional formed object OB having the shape including the finished shape is removed from the forming table 100. In the case where a support member is used in forming the molten material into the layers, the support member is, for example, cut away. Thus, the three-dimensional formed object OB having been finished can be obtained.

According to the present embodiment, the forming head 300 includes the flat screw 40. Thus, in order to form the molten material into the layers so as to have the shape following the three-dimensional formed object OB, the second step and the third step include a step in which the material is converted into the molten material by using the flat screw 40. The third step may be omitted depending on the shape of the three-dimensional formed object OB. For example, for fabricating the three-dimensional formed object OB having a small height, the desired three-dimensional formed object OB can be obtained without the third step.

Figure 6:
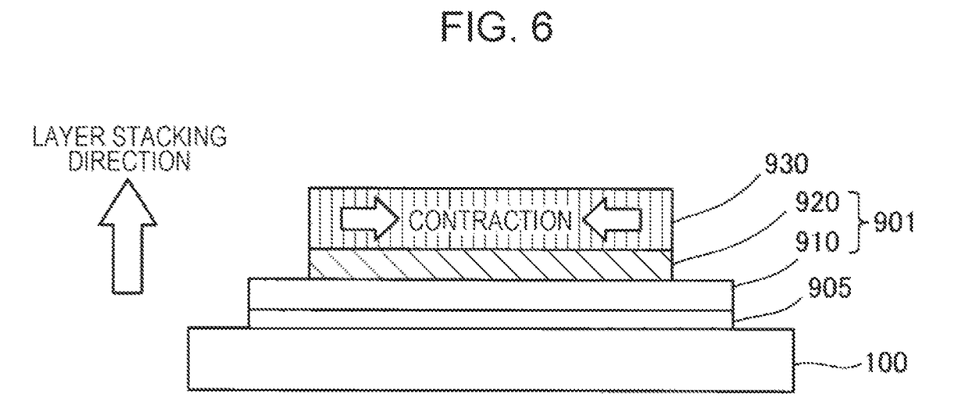
FIG. 6 illustrates contraction of a molten material having been formed into a layer or layers.

FIG. 6 illustrates how the molten material contracts by being cooled after the molten material has been formed into the layer or the layers. When the molten material is formed into the layer or the layers directly on the top of the base portion 910 without the underlying layer portion 920, the base portion 910 is likely to deprive the molten material having been formed into the layer or the layers of heat. This reduces welding strength of a weld joint between the molten material having been formed into the layer or the layers and the bottom portion 901. Since the molten material contracts when the molten material is cooled and solidified, stress due to the contraction is generated in the weld joint. The stress generated in the weld joint increases as the layer formation continues, and when the stress exceeds the welding strength, the weld joint is removed and bent. In contrast, as is the case with the present embodiment, when the underlying layer portion 920 is provided on the base portion 910, and the molten material is formed into the layer or the layers on the top of the underlying layer portion 920, the base portion 910 is unlikely to deprive the molten material having been formed into the layer or the layers of heat. This increases the welding strength of the weld joint between the molten material having been formed into the layer or the layers and the bottom portion 901. Thus, even when the layer formation continues, the weld joint is unlikely to be removed, and accordingly, bending is suppressed.

With the method of manufacturing the three-dimensional formed object according to the above-described present embodiment, the bottom portion 901 having the underlying layer portion 920 is formed on the base portion 910 by cutting in the first step, and then the molten material is formed into the layer or the layers on the top of the underlying layer portion 920 in the second step. Thus, the base portion 910 is unlikely to deprive the molten material having been formed into the layer or the layers of heat. This increases the welding strength between the molten material having been formed into the layer or the layers and the underlying layer portion 920. Thus, the molten material having been formed into the layer or the layers is unlikely to be removed from the underlying layer portion 920, and accordingly, bending of the three-dimensional formed object OB can be suppressed.

Furthermore, according to the present embodiment, before the first step is performed, the base portion 910 is secured to and brought into close contact with the forming table 100. Thus, deformation of the base portion 910 is suppressed, and accordingly, bending of the three-dimensional formed object OB can be suppressed.

Furthermore, according to the present embodiment, the material block 900 is fabricated by the three-dimensional forming apparatus 5. This allows the base portion 910, the underlying layer portion 920, the first layer portion 930, and the second layer portion 940 to be fabricated from the same material. Accordingly, variation in composition of the material can be suppressed. Thus, the composition of the material can be made uniform, and accordingly, the bending of the three-dimensional formed object OB can be further suppressed.

Furthermore, according to the present embodiment, the molten material is formed into the layers by using the forming head 300 that includes the flat screw 40 having a small size. Thus, the three-dimensional formed object OB can be manufactured by using the three-dimensional forming apparatus 5 having a small size.

Furthermore, according to the present embodiment, bending of the three-dimensional formed object OB can be suppressed without adjusting the temperature of the forming table 100 by using a heater or the like. Thus, the size of the three-dimensional forming apparatus 5 can be reduced.

B. Another Embodiment

In the three-dimensional forming apparatus 5 according to the first embodiment, the forming head 300 includes the flat screw 40. Alternatively, the forming head 300 may be a forming head 300 using a typical fused deposition modeling (FDM) method without the flat screw 40.

The invention is not limited to the above-described embodiments and can be realized in various structures without departing from the gist of the invention. For example, technical features of the embodiments corresponding to technical features of the forms described in the Summary can be appropriately replaced or combined so as to obtain a subset or the entirety of the above-described effects. Furthermore, technical features that are not described as essential in this specification can be appropriately deleted.

What is claimed is:

1. A method of manufacturing a three-dimensional object, the method comprising:
    forming a material block on a forming table;
    cutting the material block so as to fabricate a bottom portion of the three-dimensional object, the bottom portion including a base portion and an underlying layer portion, the underlying layer portion upwardly projecting from the base portion;

supplying a source material to an area between a flat screw and a barrel, a groove being formed in a first main surface of the flat screw, a heater being provided near a second main surface of the barrel, the groove including a first groove part and a second groove part, a depth of the first groove part being greater than a depth of the second groove part, the second groove part being located closer to a center of the first main surface of the flat screw than the first groove part;

kneading and heating the supplied source material located between the first and second main surfaces by heat from the heater and by rotating the flat screw with respect to the barrel around a rotation axis so that the supplied source material is plasticized;

supplying the plasticized source material to a nozzle through a communication hole provided in the barrel, the communication hole extending along the rotation axis;

depositing the plasticized source material from the nozzle selectively on a top surface of the underlying layer portion leaving the base portion by changing a relative position of the nozzle and the forming table so as to fabricate a first layer portion of the three-dimensional object in contact with the underlying layer portion; and cutting excess material in a periphery of the base portion to leave a bottom part of the base portion below the underlying layer portion on the forming table, wherein the bottom part of the base portion is part of the three-dimensional object, a thickness in a direction along the rotation axis of the flat screw is less than a width in a direction perpendicular to the rotation axis of the flat screw, and a plurality of guide grooves directly connected to the communication hole are formed in the second main surface of the barrel.

2. The method according to claim 1,
wherein, after the depositing of the plasticized source material on the top surface of the underlying layer portion, the deposited plasticized source material is solidified, and
after the deposited plasticized source material is solidified, the solidified plasticized source material is cut so as to fabricate the first layer portion of the three-dimensional object.

3. The method according to claim 1, further comprising:
depositing the plasticized source material on a top surface of the first layer portion after the first layer portion is fabricated on the top surface of the underlying layer portion;
solidifying the deposited plasticized source material on the top surface of the first layer portion; and
cutting the solidified plasticized source material so as to fabricate a second layer portion of the three-dimensional object in contact with the first layer portion.

4. The method according to claim 1, further comprising:
securing the material block on the forming table by suction before the cutting of the material block.

5. The method according to claim 1, further comprising:
depositing the plasticized source material into at least one layer so as to fabricate the material block.

6. The method according to claim 1,
wherein the plasticized source material from the nozzle is selectively deposited only on the top surface of the underlying layer portion.

* * * * *